(12) United States Patent
Kwack et al.

(10) Patent No.: US 11,233,446 B2
(45) Date of Patent: Jan. 25, 2022

(54) METHOD FOR DISCHARGING CAPACITOR OF RESONANT POWER CONVERSION APPARATUS AT INITIATING OPERATION AND RESONANT POWER CONVERSION APPARATUS THEREOF

(71) Applicant: LG ELECTRONICS INC., Seoul (KR)

(72) Inventors: Younghwan Kwack, Seoul (KR); Seongho Son, Seoul (KR); Seonho Jeon, Seoul (KR); Chuhyoung Cho, Seoul (KR); Jongseong Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/082,450

(22) Filed: Oct. 28, 2020

(65) Prior Publication Data

US 2021/0313871 A1 Oct. 7, 2021

(30) Foreign Application Priority Data

Apr. 2, 2020 (KR) .......................... 10-2020-0040245

(51) Int. Cl.
*H02M 1/34* (2007.01)
*H02M 1/00* (2006.01)
(Continued)

(52) U.S. Cl.
CPC ......... *H02M 1/0058* (2021.05); *H02M 1/344* (2021.05); *H02M 1/0048* (2021.05);
(Continued)

(58) Field of Classification Search
CPC ...... H02M 3/07; H02M 7/4815; H02M 7/523; H02M 1/0058; H02M 1/36; H02M 1/34; H02M 1/344; H02M 1/0048
See application file for complete search history.

(56) References Cited

U.S. PATENT DOCUMENTS 8,415,594 B2   4/2013  Schilling et al.
9,637,009 B2 * 5/2017  Sugiura .................. B60L 58/18
(Continued)

FOREIGN PATENT DOCUMENTS

CN      107027202      8/2017
CN      109870616      6/2019
(Continued)

OTHER PUBLICATIONS

European Search Report dated Jun. 21, 2021 issued in Application No. 21151620.8.

*Primary Examiner* — Gary L Laxton
(74) *Attorney, Agent, or Firm* — Ked & Associates, LLP

(57) ABSTRACT

A method is provided for operating a resonant power conversion apparatus The method may include charging a capacitor connected to a power source in parallel, and determining a discharge time point and a discharge period of a discharge circuit, where the discharge circuit includes a resistor and a switch connected in series and is connected to the capacitor in parallel. The method may also include outputting, by a switch control circuit, a switch control signal by determining the switch control signal based on the discharge time point and the discharge period, and discharging the charged capacitor through the resistor based on the switch control signal applied to the switch. A resonant power conversion apparatus for performing the above-described method is provided.

18 Claims, 9 Drawing Sheets

(51) Int. Cl.
 *H02M 1/36* (2007.01)
 *H02M 3/07* (2006.01)
(52) U.S. Cl.
 CPC ............. *H02M 1/34* (2013.01); *H02M 1/36* (2013.01); *H02M 3/07* (2013.01)

(56) References Cited

U.S. PATENT DOCUMENTS

| | | | |
|---|---|---|---|
| 10,232,735 B2* | 3/2019 | Koketsu | B60L 15/007 |
| 2011/0309759 A1* | 12/2011 | Shteynberg | H05B 45/14 |
| | | | 315/201 |
| 2013/0033914 A1* | 2/2013 | Yahata | H02M 7/48 |
| | | | 363/132 |
| 2018/0212545 A1* | 7/2018 | Xu | H02M 3/1582 |
| 2020/0091399 A1* | 3/2020 | Masciantonio | H02M 7/5387 |

FOREIGN PATENT DOCUMENTS

| | | |
|---|---|---|
| EP | 0561207 | 9/1993 |
| EP | 3768042 | 1/2021 |
| JP | 3992835 B2 | 8/2007 |
| WO | WO 2007/042318 | 4/2007 |

* cited by examiner

FIG. 9
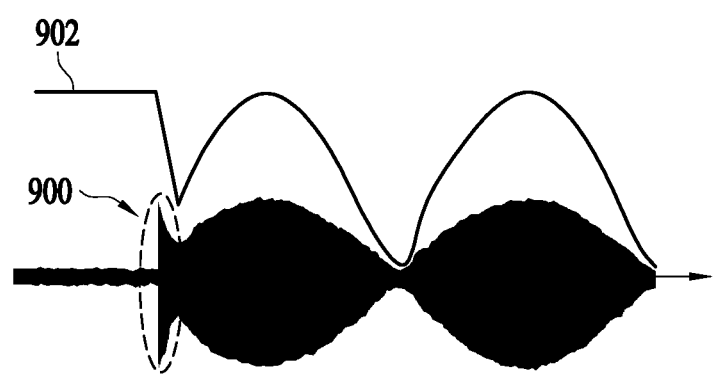
(a)
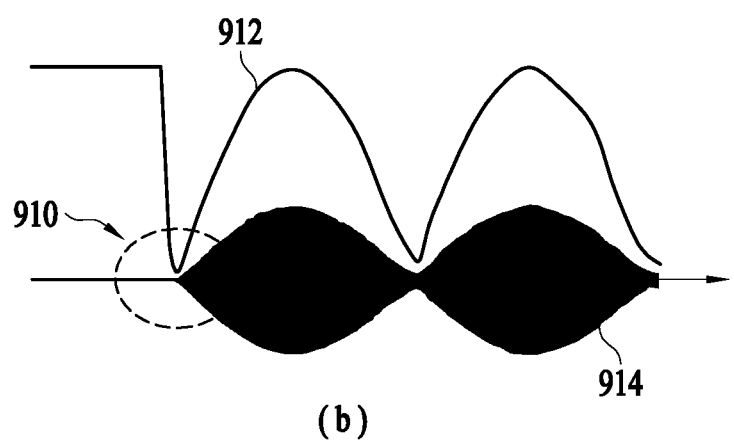
(b)

METHOD FOR DISCHARGING CAPACITOR OF RESONANT POWER CONVERSION APPARATUS AT INITIATING OPERATION AND RESONANT POWER CONVERSION APPARATUS THEREOF

CROSS-REFERENCE TO RELATED APPLICATION

This application claims the benefit of Korean Patent Application No. 10-2020-0040245, filed Apr. 2, 2020, the subject matter of which is incorporated herein by reference.

BACKGROUND

1. Field

The present disclosure relates to a method for discharging a direct current (DC) link capacitor included in a resonant power conversion apparatus at an initiating of an operation of the resonant power conversion apparatus, and the resonant power conversion apparatus to which the method is applied.

2. Background

Different types of cooking appliances may be used in homes and restaurants. For example, gas ranges may use a combustion of a fuel gas to heat food or cookware. In some examples, cooking devices may heat a target heating object, such as a pot or other cooking vessel, using electricity rather than a fuel gas.

Examples of methods for using electricity for heating a target heating object may include a resistance heating method and an induction heating method. In the electric resistance heating method, heat may be generated due to electrical resistance against a current flowing through a metal resistance wire or a non-metallic heating element such as Silicon Carbide (SIC). This heat may be transferred to a target heating object (e.g., a cooking vessel) through heat dissipation and/or heat transfer. In the induction heating method, a target heating object may be heated by an eddy current generated in the target heating object made of certain types of metal materials using an electrical field that is generated around a coil when a high frequency power having a predetermined magnitude is applied to the coil.

The induction heating method may be applied to cooktops. In the cooktop, a resonant power conversion apparatus may be used to apply a high-output high-frequency current to a working coil, thereby heating a heated object. The resonant power conversion apparatus for heating the heated object may include a direct current (DC) link capacitor. The DC link capacitor may be a smoothing capacitor to be charged based on a voltage input from a power source. The DC link capacitor may serve as a buffer that enables a relatively constant voltage supply by maintaining a voltage when converting power supplied from the power supply. The resonant power conversion apparatus may rectify alternating current (AC) input power, charge the DC link capacitor with the rectified power, and then initiate an operation.

In a related art, Japanese Patent No. 3992835, the subject matter of which is incorporated herein by reference, discloses a logic for determining a short-circuiting width for each container and a circuit for short-circuiting an AC power source to reduce a repulsive force of a non-magnetic container and improve a power factor of a reactor may be provided. The disclosure may improve the power factor and reduce the repulsive force by short-circuiting the input power source without discharging a voltage of a DC link capacitor.

BRIEF DESCRIPTION OF THE DRAWINGS

Arrangements and embodiments may be described in detail with reference to the following drawings in which like drawings refer to like elements and whereas:

FIG. 9 illustrates that a drastic current change does not occur in a resonant power conversion apparatus when an operation is initiated after discharging a charged capacitor according to an example embodiment.

DETAILED DESCRIPTION

Figure 1:
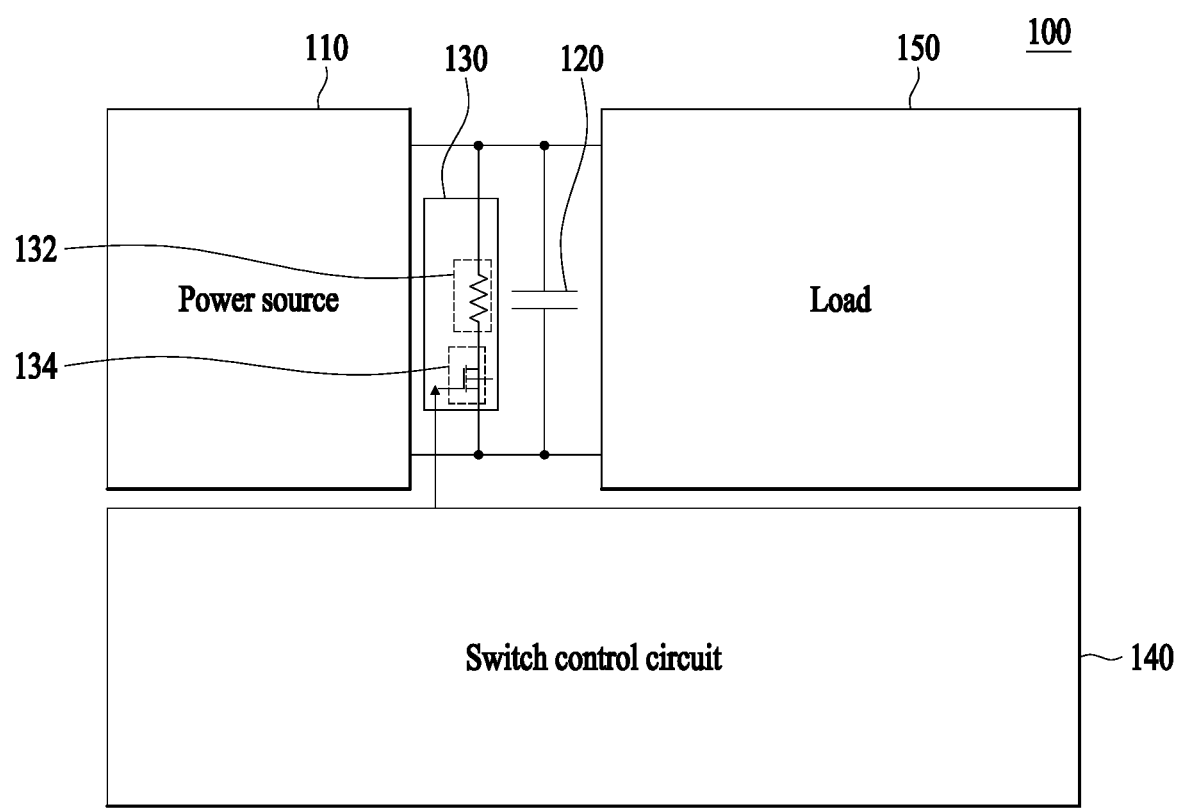
FIG. 1 illustrates a resonant power conversion apparatus according to an example embodiment.

FIG. 1 illustrates a resonant power conversion apparatus 100 according to an example embodiment. The resonant power conversion apparatus 100 may include a power source 110, a capacitor 120, a discharge circuit 130, and a switch control circuit 140. The power source 110 may supply power. The capacitor 120 may be connected to the power source 110 in parallel and charged with the power supplied from the power source 110. A discharge circuit 130 may be parallel-connected to the capacitor 120 to discharge the charged capacitor 120 before the power from the power source 110 is supplied to a load 150. The switch control circuit 140 outputs a switch control signal to a switch 134 (of the discharge circuit) to control a discharge time point and a discharge period of the discharge circuit 130. The discharge circuit 130 may include a resistor 132 and the switch 134 connected in series. The resonant power conversion apparatus 100 may receive a rectified alternative current (AC) input voltage through the power source 110, which may include a rectifier.

The resonant power conversion apparatus 100 may control an on/off operation of the switch 134 (included in the discharge circuit 130) based on a switch control signal, thereby controlling a point in time at which current flows in the resistor 132 (included in the discharge circuit 130) (hereinafter referred to as "discharge time point") and a period of time during which the current flows in the resistor 132 (hereinafter referred to as "discharge period"). The discharge time point and the discharge period may be previously designed through the switch control circuit 140 by using a logic circuit obtained by implementing a Boolean algebra in a physical device. For example, the switch control signal output from the switch control circuit 140 may correspond to a signal output through the logic circuit included in the switch control circuit 140. The logic circuit included in the switch control circuit 140 may include a sequential logic circuit or various combinational logic circuits such as AND, OR, NOR, NOT, NAND, XOR, XNOR, flip flop, latch, buffer, and the like. Additionally, the logic circuit included in the switch control circuit 140 may include various logic elements that perform complex logic functions in which a basic Boolean algebra is combined. The logic circuit included in the switch control circuit 140 may include programmable logic device (PLD), complex programmable logic devices (CPLD), field programmable gate array (FPGA), and application specific integrated circuit (ASIC), for example.

In the switch control circuit 140, a zero-voltage cross signal, a voltage comparator signal, a discharge initiation signal, and/or a discharge suspension signal may be used. The switch control circuit 140 may output, to the switch 34, a switch control signal determined by the logic circuit, thereby controlling on/off operations of the switch 134. At least one of the zero-voltage cross signal, the voltage comparator signal, the discharge initiation signal, the discharge suspension signal, and/or the switch control signal may be a digital signal having a value of 0 or 1 according to a binary method or an analog signal corresponding thereto.

The current flowing in the resistor 132 may be adjusted based on the discharge time point and the discharge period determined based on the switch control signal. Accordingly, an amount of power to be discharged from the resistor 132 may be determined. An amount of power discharged from the resistor 132 before operation of the resonant power conversion apparatus 100 is initiated may correspond to an amount of power discharged from a charged capacitor.

A process of determining the switch control signal output from the switch control circuit 140 to the switch 134 may be described in detail.

Figure 2:
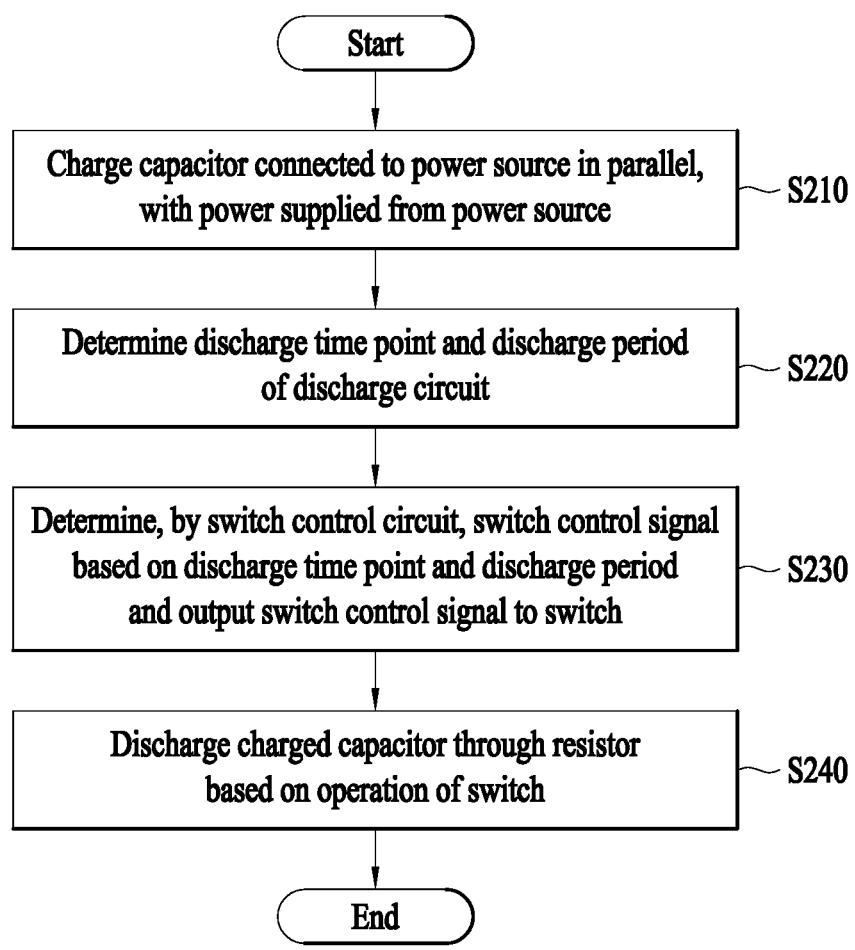
FIG. 2 is a flowchart of a method of determining a discharge time point and a discharge period for discharging a charged capacitor using a resistor at initiating an operation in a resonant power conversion apparatus according to an example embodiment.

FIG. 2 is a flowchart of a method of determining a discharge time point and a discharge period for discharging the charged capacitor 120 by using the resistor 132 at initiating an operation in the resonant power conversion apparatus 100 according to an example embodiment.

In operation S210, the resonant power conversion apparatus 100 may charge, based on power from the power source 110, the capacitor 120 connected in parallel to the power source 110. The capacitor 120 may be in a state charged by a predetermined voltage based on a rectified voltage from the power source 110. For example, since an instantaneous maximum voltage of an input voltage has a value of approximately 220/0.707 volts (V) even when an AC input voltage of 220 V is rectified in the power source 110 and applied to the capacitor 120, the capacitor 120 may be in a state charged at a voltage of approximately 311 V. In this example, when an operation of the resonant power conversion apparatus 100 is initiated without discharging the charged capacitor 120, a high current may instantaneously flow in the load 150. To prevent such an instantaneous current flow, the resonant power conversion apparatus 100 may perform a discharging process.

In operation S220, the resonant power conversion apparatus 100 may determine a discharge time point and a discharge period of the discharge circuit 130. The discharge circuit 130 may include the resistor 132 and the switch 134 connected in series. The discharge circuit 130 may be connected in parallel with the capacitor 120. For example, when the switch 134 (included in the discharge circuit 130) is in an on state, a voltage applied to the resistor 132 (of the discharge circuit 130) may correspond to a voltage of the capacitor 120. Thus, the resistor 132 may be used to discharge the charged capacitor 120.

The discharge time point and the discharge period may be determined based on a zero-voltage cross signal and a voltage comparator signal provided based on an input voltage of the power source 110. A process of determining the discharge time point and the discharge period may be performed based on a value determined (or designed) by at least one logic element (e.g., hardware) included in a logic circuit, rather than being performed by an operation process through specific software.

In operation S230, the switch control circuit 140 may determine (or provide) a switch control signal based on the discharge time point and the discharge period, and output the switch control signal to the switch 134. In response to receiving the switch control signal, the switch 134 may perform an on/off operation based on a High signal (or High state) or a Low signal (or Low state) indicated by the switch control signal (or corresponding to the switch control signal).

In operation S240, the resonant power conversion apparatus 100 may discharge the charged capacitor 120 through the resistor 132 based on an operation of the switch 134 turned on or off in response to the switch control signal. Since the switch 134 is connected in series with the resistor 132, a voltage and a current applied to the resistor 132 may be adjusted in accordance with operation of the switch 134. When the switch 134 is in the on state, the voltage of the capacitor 120 may be applied to the resistor 132, whereby a current flows in the resistor 132. Due to the current flowing in the resistor 132, at least a portion of charge stored in the capacitor 120 may be discharged.

Figure 3:
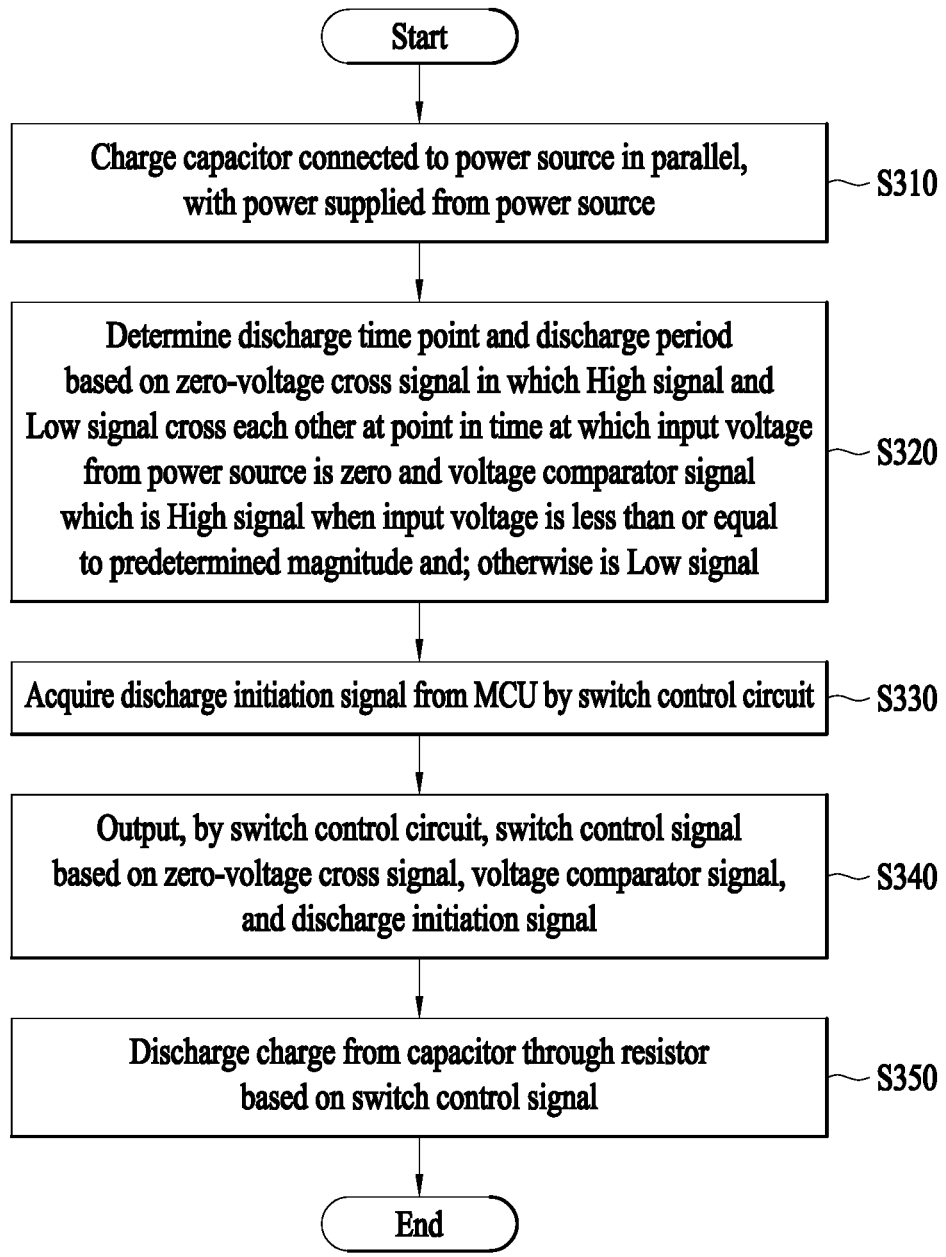
FIG. 3 is a flowchart of a method of determining a discharge time point and a discharge period based on a zero-voltage cross signal and a voltage comparator signal and outputting a switch control signal based on a discharge initiation signal acquired from a microcontroller unit (MCU) according to an example embodiment.

FIG. 3 is a flowchart of a method of determining a discharge time point and a discharge period based on a zero-voltage cross signal and a voltage comparator signal, and outputting a switch control signal based on a discharge initiation signal acquired from a microcontroller unit (MCU) according to an example embodiment. Technical features of operations S310 and S350 of FIG. 3 may be similar or identical to technical features of operations S210 and S240 of FIG. 2, and thus a further description may be omitted.

In operation S320, the resonant power conversion apparatus 100 may determine a discharge time point and a discharge period based on a zero-voltage cross signal and a voltage comparator signal. The zero-voltage cross signal may be a signal in which a High signal and a Low signal cross each other at a point in time in which an input voltage from the power source 110 is zero. The voltage comparator signal may be a High signal (or have a High state) when the input voltage is less than or equal to a predetermined magnitude, and the voltage comparator signal may be a Low signal (or have a Low state) when the input voltage is greater than the predetermined magnitude. A process of determining the discharge time point and the discharge period may be performed by the switch control circuit 140 (of the resonant power conversion apparatus 100). The switch control circuit 140 may determine the discharge time point and the discharge period of the resistor 132 indicated in the switch control signal output based on a logic circuit. In other words, the discharge time point and the discharge period may be a point in time in which an operation of turning the switch 134 on is started and a period of time during which an on state of the switch 134 is maintained.

Figure 4:
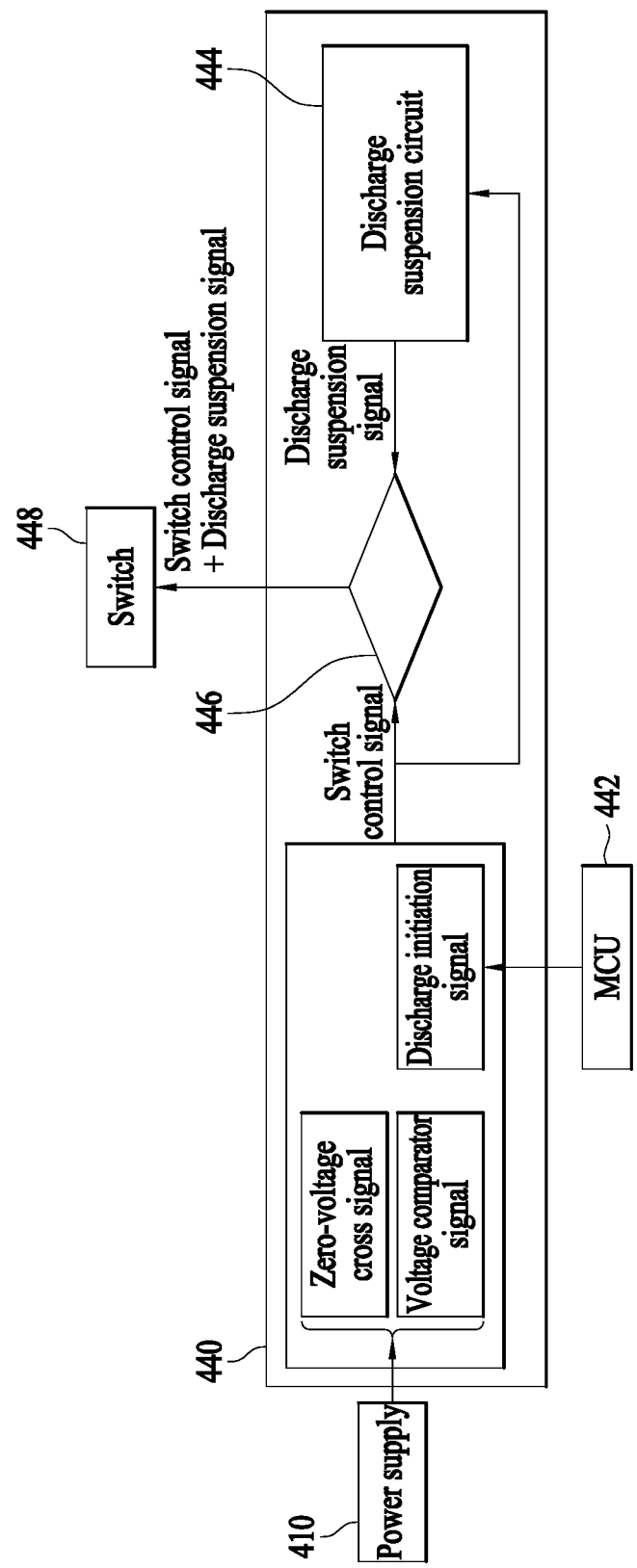
FIG. 4 illustrates a process of changing a switch control signal determined based on a zero-voltage cross signal, a voltage comparator signal, and a discharge initiation signal, in a resonant power conversion apparatus using a discharge suspension signal according to an example embodiment.

FIG. 4 illustrates a process of changing a switch control signal (determined based on a zero-voltage cross signal, a voltage comparator signal, and/or a discharge initiation signal) using a discharge suspension signal in a resonant power conversion apparatus 100 according to an example embodiment. A power source 410 (or power supply), a switch control circuit 440, and a switch 448 shown in FIG. 4 may correspond to the power source 110, the switch control circuit 140, and the switch 134 shown in FIG. 1.

The switch control circuit 440 may acquire (or receive) a zero-voltage cross signal in which a High signal and a Low signal cross each other at a point in time in which an input voltage from the power source 410 is zero, and a voltage comparator signal which is a High signal (or have a High state) when the input voltage from the power source 410 is less than or equal to a predetermined magnitude, and otherwise the voltage comparator signal is a Low signal. The switch control circuit 440 may determine a discharge time point and a discharge period based on the zero-voltage cross signal and the voltage comparator signal.

The resonant power conversion apparatus 100 may use an input voltage from the power source 410 to determine the zero-voltage cross signal and the voltage comparator signal. The zero-voltage cross signal may be a signal in which a High signal and a Low signal cross each other at a point in time in which an input voltage from the power source 410 is zero. The voltage comparator signal may be a signal that indicates a High signal when an input voltage from the power source 410 is less than or equal to a predetermined magnitude, and indicates a Low signal when the input voltage is greater than the predetermined magnitude. At least one of the zero-voltage cross signal and the voltage comparator signal may be a signal output from a logic circuit that receives an input voltage from the power source 410. The switch control circuit 440 may include a logic circuit for outputting (or providing) at least one of the zero-voltage cross signal and the voltage comparator signal based on the input voltage from the power source 410.

In operation S330, the resonant power conversion apparatus 100 may acquire, in the switch control circuit 440, a discharge initiation signal from a microcontroller unit (MCU) 442. The discharge initiation signal may be a predetermined signal output from the MCU 442 (included in the resonant power conversion apparatus 100). The switch control circuit 440 may transfer, to the switch 448, the switch control signal as a High signal only when the discharge initiation signal is a High signal. When it is determined to initiate an operation, the discharge initiation signal may change from a Low signal to a High signal. The resonant power conversion apparatus 100 may determine through the MCU 442 that an external signal indicating the initiation of the operation is received. When it is determined to initiate the operation, the MCU 442 may output, to the switch control circuit 440, the discharge initiation signal as the High signal.

The discharge initiation signal may have a value that is changed to a High signal at a point in time in which the input voltage from the power source 410 has a predetermined magnitude and is then changed to a Low signal after a predetermined time. After a point in time in which it is determined to initiate the operation, the MCU 442 may determine the discharge initiation signal having the High signal or the Low signal based on the magnitude of the input voltage input from the power source 410 and output the determined discharge initiation signal. For example, the MCU 442 may output the discharge initiation signal as the High signal at the point in time in which the input voltage has the predetermined magnitude after the point in time in which it is determined to initiate the operation. In this example, when a predetermined time elapses after the High signal is output, the MCU 442 may output the discharge initiation signal having the Low signal.

For example, a point in time in which the discharge initiation signal is output as the High signal may be a point in time in which the input voltage is peak after the MCU 442 determines to initiate the operation. In this example, the discharge initiation signal may be output as the Low signal after a predetermined time elapses from the point in time in which the input voltage is peak.

The MCU 442 may output, to the switch control circuit 440, the discharge initiation signal changed to a High signal, and then changed to a Low signal after a predetermined time based on a point in time in which a magnitude of the input voltage is zero. The time set for outputting the discharge initiation signal as the Low signal may be a predetermined time less than or equal to a period of the input voltage from the power source 410.

In operation S340, the switch control circuit 440 (of the resonant power conversion apparatus 100) may acquire the zero-voltage cross signal and the voltage comparator signal determined based on the input voltage from the power source 410, and the discharge initiation signal received from the MCU 442. The switch control circuit 440 may output, to the switch 448, the switch control signal determined based on the zero-voltage cross signal, the voltage comparator signal, and the discharge initiation signal.

The switch control circuit 440 may output the switch control signal as the High signal to the switch 448 when the discharge initiation signal, the zero-voltage cross signal, and the voltage comparator signal are all the High signals.

The switch control circuit 440 may include a discharge suspension circuit 444 that outputs (or provides) the discharge suspension signal as the High signal at a point in time in which the switch control signal is changed from the High signal to the Low signal. Based on the discharge suspension signal output from the discharge suspension circuit 444, a period in which the switch 448 operates in an on state may be determined in response to the switch control signal. When the discharge suspension signal is the High signal, the switch control circuit 440 may output the Low signal to the switch 448 as the switch control signal. For example, even if the switch control signal is the High signal, when the discharge suspension signal is the High signal, the switch control signal acquired by the switch 448 may be the Low signal.

When an error occurs in the switch control signal determined based on the zero-voltage cross signal, the voltage comparator signal, and the discharge initiation signal (for example, when the switch control signal consistently indicates the High signal or the Low signal), the switch 448 may operate based on the switch control signal and an inappropriate discharging process may be performed in the resistor 132, which may lead to damage of the resistor 132. The discharge suspension circuit 444 may receive the switch control signal determined based on the zero-voltage cross signal, the voltage comparator signal, and the discharge initiation signal, and the discharge suspension circuit 444 may output the discharge suspension signal based on the received switch control signal, thereby correcting the error occurring due to the switch control signal output from the switch control circuit 440 to the switch 448.

The discharge suspension circuit 444 may output the discharge suspension signal based on a signal indicated by the switch control signal determined based on the discharge initiation signal, the zero-voltage cross signal, and the voltage comparator signal. The discharge suspension circuit 444 may determine a point in time in which the High signal of the discharge suspension signal is output or a point in time in which the Low signal of the discharge suspension signal is output, based on the switch control signal.

The discharge suspension circuit 444 may output the discharge suspension signal as the High signal (for example, change the discharge suspension signal from the Low signal to the High signal) at a point in time in which the switch control signal determined based on the discharge initiation signal, the zero-voltage cross signal, and the voltage comparator signal is changed from the High signal to the Low signal.

The switch control circuit 440 may output, to the switch 448, a result of a combination 446 of the switch control signal and the discharge suspension signal. The switch control signal determined based on the discharge initiation signal, the zero-voltage cross signal, and the voltage comparator signal may output as the High signal based on the discharge time point and the discharge period after the MCU 442 determines to initiate the operation. When an error does not occur in the switch control signal, irrespective of a combination with the discharge suspension signal, the switch control signal determined based on the discharge period and the discharge time point may be directly output to the switch 448. When an error occurs in the switch control signal, instead of the switch control signal in which the error occurs, the switch control signal determined based on the discharge period and the discharge time point may be output to the switch 448 in combination with the discharge suspension signal.

Figure 5:
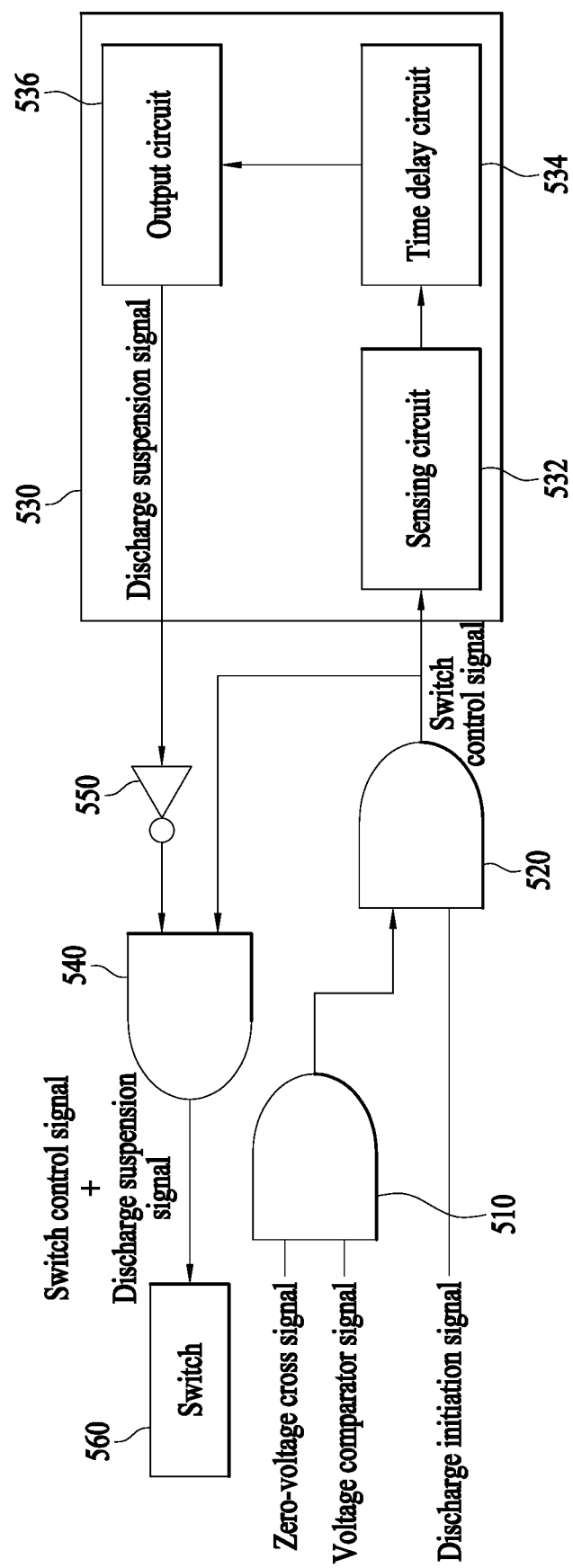
FIG. 5 illustrates a process of changing a switch control signal using a discharge suspension signal in a resonant power conversion apparatus that includes a logic circuit according to an example embodiment.

FIG. 5 illustrates a process of changing a switch control signal using a discharge suspension signal in the resonant power conversion apparatus 100 that includes a logic circuit according to an example embodiment.

The switch control circuit 140 may include one or more AND gates 510, 520, and 540. The AND gate 510 may receive a zero-voltage cross signal and a voltage comparator signal may output a High signal when both the zero-voltage cross signal and the voltage comparator signal are High signals. The AND gate 520 may receive an output from the AND gate 510 (receiving the zero-voltage cross signal and the voltage comparator signal), and a discharge initiation signal may output a High signal when the received signals are High signals. In this example, the output High signal may be a switch control signal before being combined with the discharge suspension signal.

A discharge suspension circuit 530 may include a sensing circuit 532, a time delay circuit 534, and an output circuit 536. The sensing circuit 532 may receive a switch control signal output from the AND gate 520 and may sense whether the switch control signal is a High signal or a Low signal. The time delay circuit 534 may delay a High-signal output time point of a discharge suspension signal by a predetermined time from a point in time at which the switch control signal is changed from the High signal to the Low signal. The output circuit 536 may output a discharge suspension signal indicating the High signal after the delay of the predetermined time. The sensing circuit 532 may receive the switch control signal. The discharge suspension circuit 530 may include at least one logic element. The sensing circuit 532 may be implemented as hardware such as an operational amplifier (OPAMP) operating as a comparator, for example, but should not be construed as being limited thereto. The time delay circuit 534 may include a logic element that delays an input signal, such as latch, flip flop, and the like.

The discharge suspension circuit 530 may output the discharge suspension signal as the Low signal after a predetermined time elapses from a point in time at which the discharge suspension signal corresponding to the High signal starts to be output. The discharge suspension circuit 530 may determine to output the discharge suspension signal as the High signal after delaying, by a predetermined time, a point in time at which a change of the switch control signal to the Low signal is sensed. At a point in time to which the predetermined time elapses since the discharge suspension signal as the High signal starts to be output, the discharge suspension signal may be changed to the Low signal. As such, the discharge suspension circuit 530 may change the High signal to the Low signal after the predetermined time elapses so that a discharging process is performed based on the switch control signal normally output thereafter.

The switch control circuit 140 may include the AND gate 540 to output a result of a combination of the discharge suspension signal (output from the discharge suspension circuit 530) and the switch control signal (output from the AND gate 520). When the discharge suspension signal corresponding to the Low signal and the switch control signal corresponding to the High signal are input to the AND gate 540, the High signal may be output from the AND gate 540 to a switch 560. Even if the discharge suspension signal corresponding to the High signal and the switch control signal corresponding to the High signal are input to the AND gate 540, the Low signal may be output from the AND gate 540 to the switch 560. For this, the switch control circuit 140 may include a NOT gate 550 to invert the discharge suspension signal received from the discharge suspension circuit 530.

The above-described logic elements (used in various embodiments) are merely an example for convenience in describing a process of processing an input/output signal in the present disclosure. Therefore, in the present disclosure, logic elements used within a range may be easily implemented by those skilled in the art and can be widely used for input/output of the various signals described above.

Figure 6:
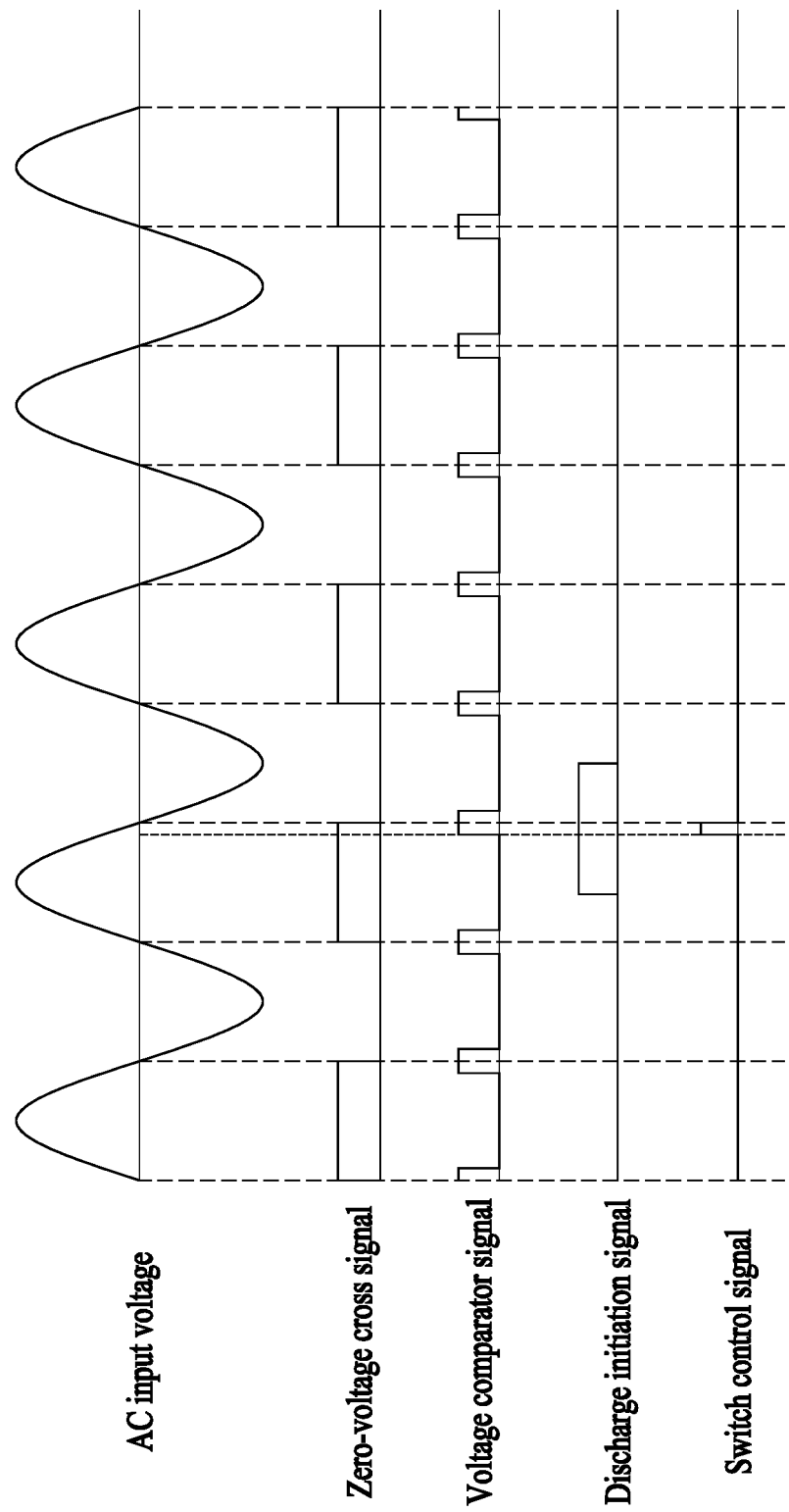
FIG. 6 illustrates a switch control signal that is output to a switch based on a zero-voltage cross signal, a voltage comparator signal, and a discharge initiation signal according to an example embodiment.

FIG. 6 illustrates a switch control signal that is output to a switch based on a zero-voltage cross signal, a voltage comparator signal, and a discharge initiation signal according to an example embodiment. An AC input voltage may be an input voltage before being rectified in the power source 110. Since the switch control circuit 140 may output, as a zero-voltage cross signal, a signal in which a High signal and a Low signal cross each other based on a point in time at which an input voltage from the power source 110 is zero, the zero-voltage cross signal may have a pattern in which the High signal and the Low signal cross at intervals of a preset time. Since the switch control circuit 140 outputs the High signal as the voltage comparator signal when a magnitude of the input voltage from the power source 110 is less than or equal to a predetermined magnitude, the voltage comparator signal may indicate a High signal in a form symmetric based on the point in time at which the input voltage is zero. Thus, a time in which both the zero-voltage cross signal and the voltage comparator signal are the High signals may correspond to a half of a time in which the voltage comparator signal is the High signal. Based on the zero-voltage cross signal and the voltage comparator signal, a discharge period in which a discharge is performed in the resistor 132 may be determined. A discharging process may be performed in the resistor 132 within a time in which the discharge initiation signal is the High signal. The switch control signal determined based on the zero-voltage cross signal, the voltage comparator signal, and the discharge initiation signal may be output from the switch control circuit 140 to the switch 134.

Figure 7:
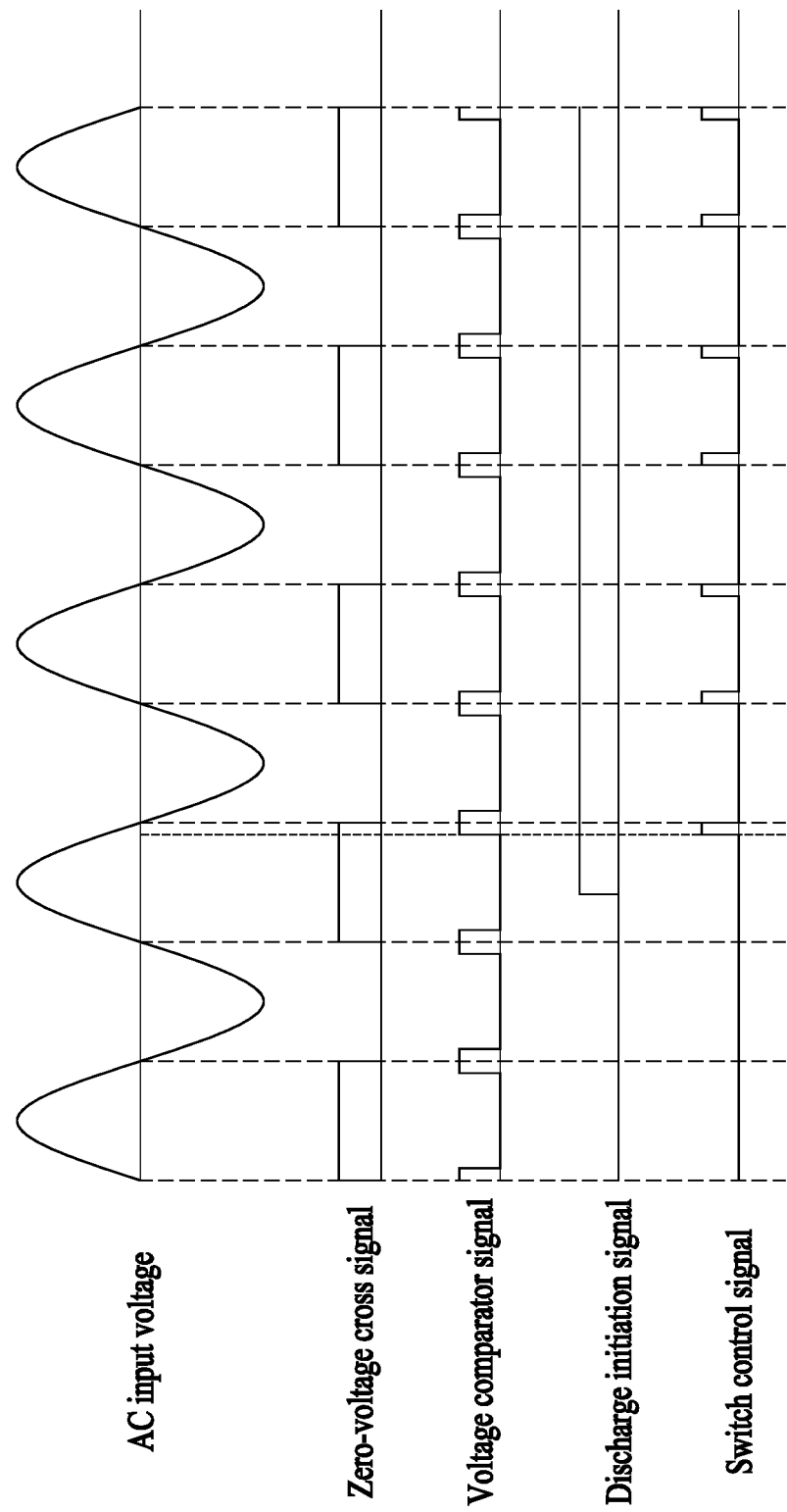
FIG. 7 illustrates a malfunction of a switch control signal due to an error of a discharge initiation signal according to an example embodiment.

FIG. 7 illustrates a malfunction of the switch control signal due to an error of a discharge initiation signal according to an example embodiment. With respect to FIG. 7, in a process of outputting a switch control signal, an error may occur when a discharge initiation signal is not changed to a Low signal after a predetermined time. Due to the error, a switch control circuit may repetitively output, to the switch 134, a switch control signal in a form of pulse. In this example, power consumption of the resistor 132 may abnormally increase due to a repetitive on/off operation of the switch 134, which may lead to damage to the resistor 132.

Figure 8:
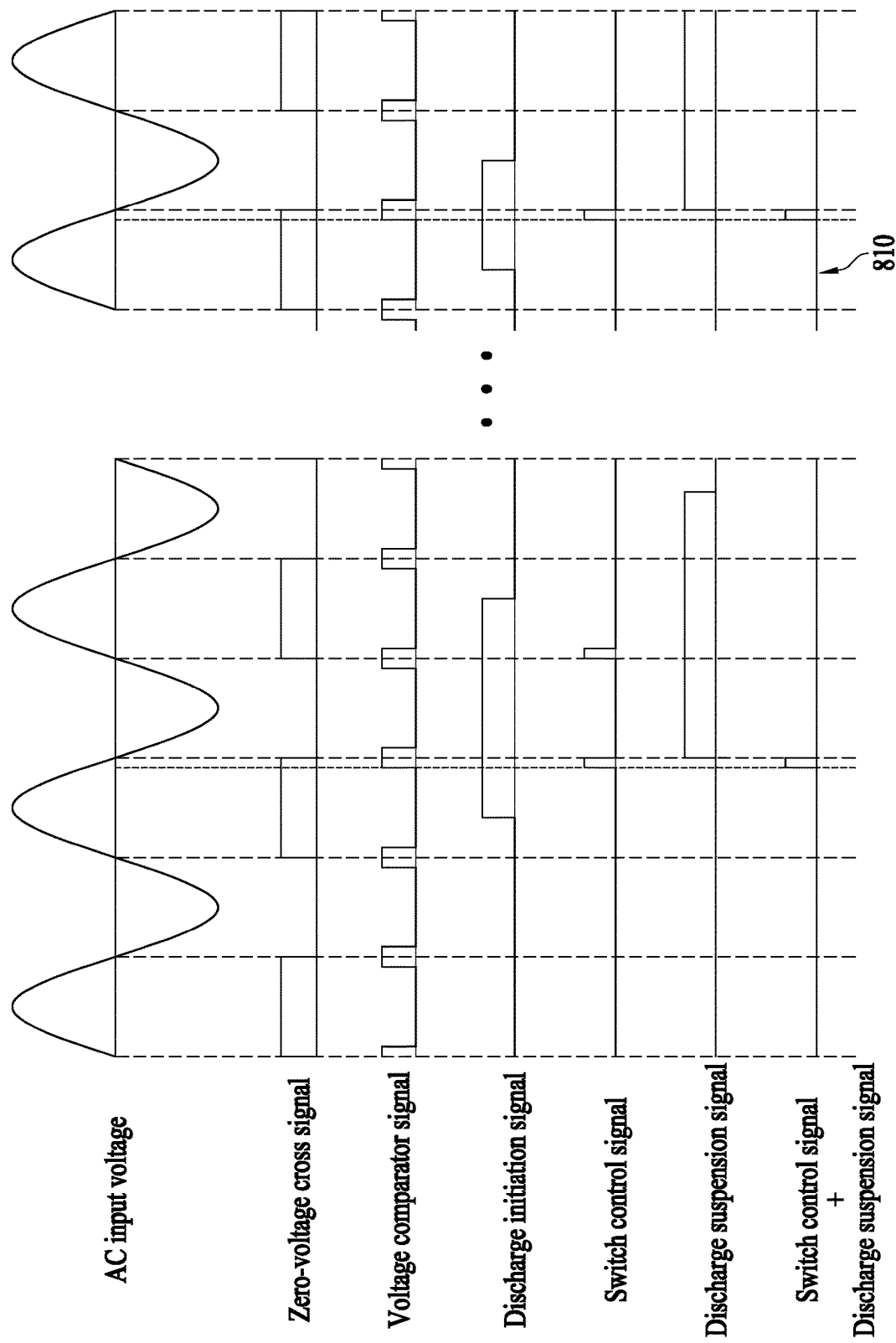
FIG. 8 illustrates a switch control signal corrected through a discharge suspension signal according to an example embodiment.

FIG. 8 illustrates a switch control signal corrected based on a discharge suspension signal according to an example embodiment. To prevent malfunction of the switch control circuit 140 described with reference to FIG. 7, the discharge suspension circuit 444 (included in the switch control circuit 140) may be used. The discharge suspension circuit 444 may output a discharge suspension signal as a High signal, starting from a point in time at which a switch control signal is changed from a High signal to a Low signal. The discharge suspension signal as the High signal may be maintained for a predetermined time. During the predetermined time, even if the switch control signal corresponds to the High signal, the switch control signal corresponding to the High signal may not be output to the switch 134. Thus, based on a combination of the discharge suspension signal and the switch control signal, the switch 134 may receive a switch control signal in a form of pulse for a limited number of times (e.g., the first one time) when it is determined that an operation is initiated. Through this, damage to the resistor 132 may be prevented. Since the discharge suspension signal is changed to the Low signal after a predetermined time based on a point in time at which the discharge suspension signal is changed to the High signal, the discharge suspension circuit 444 may allow a normal discharging process to be performed at a point in time (e.g., a point in time 810) in which it is determined that the operation is initiated again thereafter.

FIG. 9 illustrates that a drastic current change does not occur in a resonant power conversion apparatus when an operation is initiated after a charged capacitor is discharged according to an example embodiment.

Referring to (a) of FIG. 9, at a point in time at which the resonant power conversion apparatus 100 using an AC input voltage of 220 V is operated, a voltage 902 of the charged capacitor 120 may be about 344 V. When the resonant power conversion apparatus 100 including the capacitor 120 charged in a state of having such a high voltage starts an operation, a high current may instantaneously flow in the load 150 as indicated by a dashed circle 900. Due to this, noise may be generated in the resonant power conversion apparatus 100 at the initiating of the operation. The instantaneous current flow may cause damage to an element.

Referring to (b) of FIG. 9, the resonant power conversion apparatus 100 may initiate an operation in a state in which the charged capacitor 120 is discharged by the resistor 132 (included in the discharge circuit 130) as indicated by a dashed circle 910. For example, a voltage 912 of the capacitor 120 may have a value of about zero at the initiating of the operation. Unlike an example in which the operation is initiated without discharging as shown in (a), in an example of (b), a current 914 flowing in the load 150 may not instantaneously increase at the initiating of the operation. In this example, a current close to about zero may start to flow into the load 150. Accordingly, noise may be reduced at a point in time at which the operation is to be initiated. Also, the damage to the element occurring due to the instantaneous current flow at the initiating of the operation may be prevented.

The resonant power conversion apparatus 100 may include a computer-readable recording medium or memory that includes a program to perform the above-described methods. The above-described methods of the present disclosure may be provided as a program to be executed in a computer and may be recorded on a computer-readable recording medium.

According to example embodiments of the present disclosure, it is possible to prevent an instantaneous change of current during initiating an operation of a resonant power conversion apparatus. For example, the instantaneous change of current and removal of noise may be prevented at the initiating of the operation based on a discharge of a voltage of a DC link capacitor.

According to example embodiments of the present disclosure, a stability in operating a resonant power conversion apparatus by preventing an instantaneous change of current during initiating the operation of the apparatus.

According to example embodiments of the present disclosure, it is possible to precisely control a discharge time point and a discharge period of a resistor for discharging a charged DC link capacitor. Through this, it is possible to prevent power consumption of a resistor exceeding that considered in a process of designing the resistor, thereby preventing damage to the resistor.

When an operation of a resonant power conversion apparatus is initiated in a state in which a direct current (DC) link capacitor (included in the resonant power conversion apparatus) is charged, an instantaneous current inflow may occur due to a voltage (e.g., about 344 volts (V)) of the charged DC link capacitor. In this example, such current may flow into and/or be discharged from the resonant power conversion apparatus, which may cause driving noise and lead to damage to elements therein.

A resistor may be used for discharging the charge from the DC link capacitor. When a microcontroller unit (MCU) controls an appropriate discharge time point and an appropriate discharge period of the resistor through software, an error may occur, so the MCU fails in precisely controlling the discharge of the resistor at an accurate timing during a driving process. In this example, power exceeding power consumption of the resistor considered in designing may be applied so the resistor is damaged.

An aspect of the present disclosure is to initiate an operation of a resonant power conversion apparatus after discharging a charge from a DC link capacitor (included in the resonant power conversion apparatus).

Another aspect of the present disclosure is to determine a discharge time point and a discharge period by a logic circuit to precisely control the discharge time point and the discharge period in a resistor designed to discharge a charge from a DC link capacitor (included in a resonant power conversion apparatus).

Another aspect of the present disclosure is to determine a discharge time point and a discharge period by a logic circuit implemented as hardware such that an operation of a resonant power conversion apparatus is initiated immediately after a discharge of a charge stored in a DC link capacitor (included in the resonant power conversion apparatus).

According to an aspect, there is provided a resonant power conversion apparatus including a power source configured to supply power, a capacitor connected to the power source in parallel and charged with the power supplied from the power source, a discharge circuit connected to the capacitor in parallel to discharge the capacitor before the power is supplied from the power source to a load, the discharge circuit including a resistor and a switch connected in series, and a switch control circuit configured to output a switch control signal to the switch to control a discharge time point and a discharge period of the discharge circuit.

According to another aspect, there is also provided a method of operating a resonant power conversion apparatus, the method including charging a capacitor connected to a power source in parallel, with power supplied from the power source, determining a discharge time point and a discharge period of a discharge circuit, the discharge circuit which includes a resistor and a switch connected in series and is connected to the capacitor in parallel, outputting, by a switch control circuit, a switch control signal by determining the switch control signal based on the discharge time point and the discharge period, and discharging the charged capacitor through the resistor based on an operation of the switch.

In addition to the aforementioned effects, other specific effects have been described above with reference to the foregoing embodiments of the present disclosure.

The method according to the present disclosure may be executed via software. When executed via software, the constituent elements of the present disclosure are code segments that execute required operations. The program or the code segments may be stored in a processor readable medium.

The computer-readable recording medium includes all kinds of recording devices in which data is stored in a computer-readable manner. Examples of the computer-readable recording device include a ROM, a RAM, a CD-ROM, a DVD-ROM, a DVD-RAM, a magnetic tape, a floppy disc, a hard disc, and an optical data storage device. In addition, the computer-readable recording medium may be distributed in a computer device connected thereto via a network so that a computer-readable code may be stored and executed in a distribution manner.

The above-described method according to the present disclosure may be provided as a program to be executed in a computer and may be recorded on a computer readable recording medium.

Hereinafter, implementations of the present disclosure will be described in detail with reference to the drawings so that those skilled in the art to which the present disclosure pertains can easily perform the present disclosure. The present disclosure may be implemented in many different forms and is not limited to the implementations described herein.

For brevity of description, a part that is not related to the description may be omitted, and the same or similar components are denoted by the same reference numerals throughout the specification. Further, some implementations of this application will be described in detail with reference to exemplary drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Further, in implementing the present disclosure, for convenience of explanation, components may be described by being subdivided; however, these components may be implemented in a device or a module, or a single component may be implemented by being divided into a plurality of devices or modules.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A resonant power conversion apparatus comprising:
   a power source configured to supply power;
   a capacitor connected in parallel to the power source, and the capacitor configured to be charged with the power from the power source;
   a discharge circuit connected in parallel to the capacitor, and including a resistor and a switch connected in series, the discharge circuit configured to discharge the capacitor before the power is supplied from the power source to a load; and
   a switch control circuit configured to provide a switch control signal to the switch to control a discharge time point and a discharge period of the discharge circuit,
   wherein the switch control circuit is configured to acquire a zero-voltage cross signal and a voltage comparator signal, and to determine the discharge time point and the discharge period based on the zero-voltage cross signal and the voltage comparator signal,
   wherein the zero-voltage cross signal is a signal in which a High signal and a Low signal cross each other when an input voltage from the power source is zero, and
   wherein the voltage comparator signal is a High signal when the input voltage from the power source is less than or equal to a predetermined magnitude, and the voltage comparator signal is a Low signal when the input voltage from the power source is greater than the predetermined magnitude.

2. The resonant power conversion apparatus of claim 1, wherein the switch control signal from the switch control circuit corresponds to a signal output from a logic circuit of the switch control circuit.

3. The resonant power conversion apparatus of claim 1, comprising:
   a microcontroller unit (MCU),
   wherein the switch control circuit is configured to receive a discharge initiation signal from the MCU, and to output the switch control signal to the switch based on the discharge initiation signal, the zero-voltage cross signal, and the voltage comparator signal.

4. The resonant power conversion apparatus of claim 3, wherein the switch control circuit is configured to receive, from the MCU, the discharge initiation signal as a High signal when the input voltage from the power source has a predetermined magnitude and the discharge initiation signal is then changed to a Low signal after a predetermined time.

5. The resonant power conversion apparatus of claim 4, wherein the switch control circuit is configured to receive, from the MCU, the discharge initiation signal which is changed to a Low signal after the predetermined time when a magnitude of the input voltage is zero after the discharge initiation signal is a High signal.

6. The resonant power conversion apparatus of claim 3, wherein the switch control circuit is configured to output the switch control signal as a High signal when the discharge initiation signal, the zero-voltage cross signal, and the voltage comparator signal are all High signals.

7. The resonant power conversion apparatus of claim 1, further comprising:
   a discharge suspension circuit configured to output a discharge suspension signal as a High signal when the switch control signal is changed from a High signal to a Low signal.

8. The resonant power conversion apparatus of claim 7, wherein when the discharge suspension signal is a High signal, the switch control circuit is configured to output a Low signal to the switch as the switch control signal.

9. The resonant power conversion apparatus of claim 7, wherein the discharge suspension circuit is configured to output the discharge suspension signal as a Low signal after a predetermined time elapses from when the discharge suspension signal as a High signal starts to be output.

10. A method of operating a resonant power conversion apparatus, the method comprising:
    charging a capacitor, connected in parallel to a power source, with power supplied from the power source;
    determining a discharge time point and a discharge period of a discharge circuit, the discharge circuit including a resistor and a switch connected in series, and the discharge circuit is connected in parallel to the capacitor;
    providing, by a switch control circuit, a switch control signal determined based on the discharge time point and the discharge period; and
    discharging the charged capacitor through the resistor based on the switch control signal applied to the switch,
    wherein the determining of the discharge time point and the discharge period comprises:
        determining the discharge time point and the discharge period based on a zero-voltage cross signal and a voltage comparator signal, wherein the zero-voltage cross signal is a signal in which a High signal and a Low signal cross each other when an input voltage from the power source is zero, and wherein the voltage comparator signal is a High signal when the input voltage from the power source is less than or equal to a predetermined magnitude, and the voltage comparator signal is a Low signal when the input voltage from the power source is greater than the predetermined magnitude.

11. The method of claim 10, wherein the providing of the switch control signal comprises:

receiving, by the switch control circuit, a discharge initiation signal from a microcontroller unit (MCU); and providing, by the switch control circuit, the switch control signal based on the discharge initiation signal, the zero-voltage cross signal, and the voltage comparator signal.

12. The method of claim 11, wherein the receiving of the discharge initiation signal comprises:

receiving, by the switch control circuit, the discharge initiation signal as a High signal when the input voltage from the power source has a predetermined magnitude and the discharge initiation signal is then changed to a Low signal after a predetermined time.

13. The method of claim 12, wherein the receiving of the discharge initiation signal comprises:

receiving, from the MCU by the switch control circuit, the discharge initiation signal which is changed to a Low signal after the predetermined time when a magnitude of the input voltage is zero after the discharge initiation signal is a High signal.

14. The method of claim 11, wherein the providing of the switch control signal comprises:

providing, by the switch control circuit, the switch control signal as a High signal when the discharge initiation signal, the zero-voltage cross signal, and the voltage comparator signal are all High signals.

15. The method of claim 10, wherein the providing of the switch control signal comprises:

providing, by a discharge suspension circuit included in the switch control circuit, a discharge suspension signal as a High signal when the switch control signal is changed from a High signal to a Low signal.

16. The method of claim 15, wherein the providing of the switch control signal comprises:

providing, by the switch control circuit, the switch control signal as a Low signal to the switch when the discharge suspension signal is a High signal.

17. The method of claim 15, wherein the providing of the discharge suspension signal comprises:

providing the discharge suspension signal as a Low signal after a predetermined time elapses from when the discharge suspension signal as a High signal starts to be output.

18. A non-transitory computer-readable recording medium comprising a computer program for performing the method of claim 10.

* * * * *